United States Patent
Wu (10) Patent No.: US 8,897,252 B2
(45) Date of Patent: Nov. 25, 2014

(54) METHOD FOR TRANSMITTING DATA IN A WIRELESS COMMUNICATION SYSTEM AND SYSTEM THEREOF

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 894 days.

(21) Appl. No.: 12/485,914

(22) Filed: Jun. 17, 2009

(65) Prior Publication Data

US 2010/0322156 A1  Dec. 23, 2010

(51) Int. Cl.
| | |
|---|---|
| H04W 4/00 | (2009.01) |
| H04L 5/00 | (2006.01) |
| H04L 1/18 | (2006.01) |
| H04W 72/04 | (2009.01) |
| H04W 28/04 | (2009.01) |

(52) U.S. Cl.
CPC ............. *H04W 72/04* (2013.01); *H04W 28/04* (2013.01); *H04L 5/003* (2013.01); *H04L 1/1867* (2013.01); *H04L 1/1812* (2013.01)
USPC ........................................................ 370/330

(58) Field of Classification Search
USPC .................................................. 370/310–350
See application file for complete search history.

(56) References Cited

U.S. PATENT DOCUMENTS

| | | | |
|---|---|---|---|
| 8,381,058 B2 | 2/2013 | Omeni | |
| 2002/0001314 A1* | 1/2002 | Yi et al. | 370/469 |
| 2002/0108082 A1* | 8/2002 | McDonnell | 714/748 |
| 2004/0030790 A1* | 2/2004 | Le et al. | 709/230 |
| 2008/0146242 A1* | 6/2008 | Alanara et al. | 455/452.1 |
| 2010/0011273 A1* | 1/2010 | Parolari | 714/749 |
| 2010/0226326 A1 | 9/2010 | Ahn | |
| 2011/0305182 A1* | 12/2011 | Suzuki et al. | 370/311 |
| 2012/0026945 A1* | 2/2012 | Meyer et al. | 370/328 |

FOREIGN PATENT DOCUMENTS

| | | |
|---|---|---|
| EP | 2068505 A1 | 6/2009 |
| WO | 2008075185 A2 | 6/2008 |
| WO | 2008075185 A3 | 6/2008 |

OTHER PUBLICATIONS

Office action mailed on Mar. 7, 2013 for the Taiwan application No. 098138955, filing date Nov. 17, 2009, p. 1-6.
Office action mailed on Jan. 11, 2013 for the U.S. Appl. No. 13/364,305, filed Feb. 1, 2012, p. 1-18.
Office action mailed on Jan. 2, 2014 for the U.S. Appl. No. 13/364,305, filed Feb. 1, 2012, p. 1-14.

* cited by examiner

*Primary Examiner* — Andrew Chriss
*Assistant Examiner* — Kenan Cehic
(74) *Attorney, Agent, or Firm* — Winston Hsu; Scott Margo (57) ABSTRACT

A method for transmitting data in a wireless communication system including a User Equipment (UE) and a radio access network (RAN) includes the following steps. Firstly, the RAN transmits a MAC protocol data unit (PDU) to the UE. Afterwards, the UE returns an acknowledgement signal in response to the MAC PDU. When the RAN receives the acknowledgement signal, it allocates an uplink resource for the UE to transmit data.

7 Claims, 7 Drawing Sheets

METHOD FOR TRANSMITTING DATA IN A WIRELESS COMMUNICATION SYSTEM AND SYSTEM THEREOF

BACKGROUND OF THE INVENTION

1. Field of the Invention

The present invention relates to a method for transmitting data, and more particularly, a method for transmitting data in a wireless communication system and a system thereof.

2. Description of the Prior Art

Long Term Evolution (LTE) is being developed by the 3rd Generation Partnership Project (3GPP) and moving towards creating more efficient communication systems. In 3GPP TS 36.321 specification for LTE MAC protocol, dynamic resource allocation for uplink transmissions has been introduced for improving the efficient utilization of the radio resources between a user equipment (UE) and a Node B, i.e. a base station in an Evolved Universal Terrestrial Radio Access Network (E-UTRAN). With the dynamic resource allocation, the radio resources are allocated only when the UE has data to transmit so that the radio resources for data transmission can be saved.

As today's applications for electronic systems grow at ever-increasing rates, the demand for better communications performance is never ceasing. Standards for various technologies such as the 3rd Generation Partnership Project (3GPP) High-Speed Packet Access (HSPA) and Long Term Evolution (LTE) work towards creating more efficient communication systems. For example, dynamic resource allocation for uplink transmissions has been introduced in the 3GPP TS 36.321 standard, for communicating between a user equipment (UE) such as a mobile station or a mobile handset, and an Evolved Universal Terrestrial Radio Access Network (E-UTRAN) base station. Dynamic resource allocation utilizes radio resources more efficiently, where radio resources are allocated only when the UE has data to transmit. But a drawback becomes clear when insufficient radio resources are allocated by the E-UTRAN: the UE must request for resources to be allocated and wait for the uplink resource allocation, and this causes a delay before its data can be transmitted, slowing down the overall communication between the UE and the E-UTRAN. Fast allocation of uplink resources may be required when the UE and E-UTRAN are in an active downlink session but there is a need to transmit uplink data. Fast allocation of uplink resources may also be required when uplink data has been unsuccessfully received and needs to be retransmitted. The E-UTRAN informs the UE of the status of received data packets via STATUS PDUs, which contain positive and/or negative acknowledgements of RLC PDUs. The STATUS PDU can be sent in response to a polling request from the UE, as disclosed in RLC protocol specification 3GPP TS 36.322 v8.2.0: "The receiving side of an AM RLC entity shall trigger a STATUS report when it receives a RLC data PDU with the P field set to "1" and the HARQ reordering of the corresponding RLC data PDU is completed".

Figure 1:
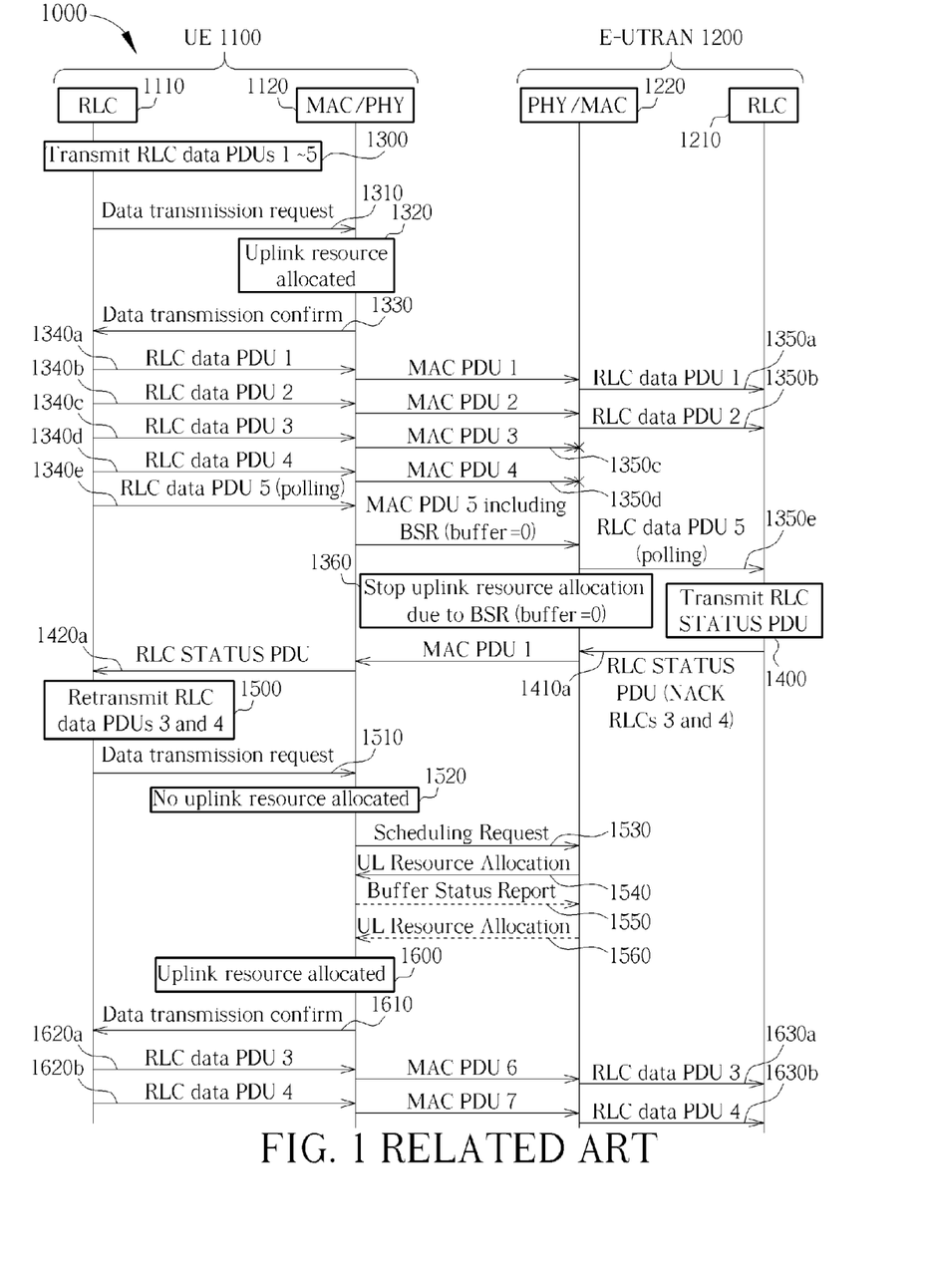
FIG. 1 shows a signaling diagram illustrating an uplink data transmission from a User Equipment (UE) to an Evolved Universal Terrestrial Radio Access Network (E-UTRAN) in an LTE system, according to the current convention.

FIG. 1 shows an exemplary signaling diagram 1000 illustrating an uplink data transmission from a User Equipment (UE) 1100 to an Evolved Universal Terrestrial Radio Access Network (E-UTRAN) 1200 in an LTE system, according to the current convention. The UE 1100 comprises a Radio Link Control (RLC) layer 1110 and a Medium Access Control and Physical (MAC/PHY) layer 1120. Similarly, the E-UTRAN 1200 comprises an RLC layer 1210 and a MAC/PHY layer 1220. In the mentioned figure and example, the RLC 1110 of the UE 1100 initiates a transmission of RLC data PDUs 1-5 (indicated at 1300), and sends a data transmission request to the MAC/PHY layer 1120 (indicated at 1310). The MAC/PHY layer 1120 notes that an uplink resource is already allocated (indicated at 1320) for the UE 1100, and thus sends a confirmation signal to the RLC 1110 so as to confirm that data transmission may begin (indicated at 1330). Following this, the RLC 1110 respectively sends the five RLC data PDUs, i.e. RLC data PDUs 1, 2, 3, 4 and 5, (indicated at 1340*a-e*) to the MAC/PHY 1120. After receiving the five RLC data PDUs, the MAC/PHY 1120 converts them as MAC PDUs and then sends them to the MAC/PHY layer 1220 of the E-UTRAN 1200 respectively. In addition, the MAC/PHY 1120 packages a Buffer Status Report (BSR), which indicates the UE transmission buffer is now empty, into the MAC PDU 5 so as to inform the E-UTRAN 1200 that the information to be sent has been sent. Upon receiving the empty buffer information, the MAC/PHY 1220 closes the uplink resource (indicated at 1360), and the final RLC data PDU 5 is received by the RLC 1210 of the E-UTRAN 1200 (indicated at 1350*e*).

From the standpoint of E-UTRAN 1200, the RLC data PDUs 1, 2, and 5 are received successfully (indicated at 1350*a*, 1350*b*, and 1350*e*), but the RLC data PDUs 3 and 4 are not received by the MAC/PHY 1220 (indicated at 1350*c* and 1350*d*). Therefore, the RLC 1210 needs to transmit an RLC status (control) PDU (indicated at 1400) to relay the acknowledgement ("received") of the RLC data PDUs 1, 2, and 5 and the negative acknowledgement ("not received") of the RLC data PDUs 3 and 4. The RLC status (control) PDU is sent (indicated at 1410*a*) and received by the RLC 1110 (indicated at 1420*a*).

After receiving the RLC status (control) PDU, the RLC 1110 needs to retransmit the RLC data PDUs 3 and 4 (indicated at 1500), and makes a data transmission request to the MAC/PHY 1120 (indicated at 1510). Because the uplink resource was stopped previously in step 1360, the MAC/PHY 1120 does not have sufficient uplink resources allocated for the data retransmission (indicated at 1520). Between the MAC/PHY 1120 of the UE 1100 and the MAC/PHY 1220 of the E-UTRAN 1200, steps 1530 through 1540 involve a Scheduling Request from the MAC/PHY 1120 to the MAC/PHY 1220 (indicated at 1530), to which the response is an uplink resource allocated by the MAC/PHY 1220 (indicated at 1540). Alternatively, the MAC/PHY 1220 may allocate the uplink resource in response to a Buffer Status Report (indicated at 1550 and 1560). When the MAC/PHY 1120 notes that the uplink resource has been allocated (indicated at 1600), it will send a confirmation signal to the RLC 1110 to confirm that data retransmission for RLC data PDUs 3 and 4 may begin (indicated at 1610).

During the time consumed by sending Scheduling Request and Buffer Status Report by the MAC/PHY 1120 and waiting for uplink resource allocation from the MAC/PHY 1220 (indicated at 1530 through 1560), the RLC 1110 must wait for the data transmission confirmation (indicated at 1610) before it may begin retransmitting the RLC data PDUs 3 and 4 (indicated at 1620*a-b*) to the RLC 1210 of the E-UTRAN 1200 (indicated at 1630*a-b*).

Figure 3:
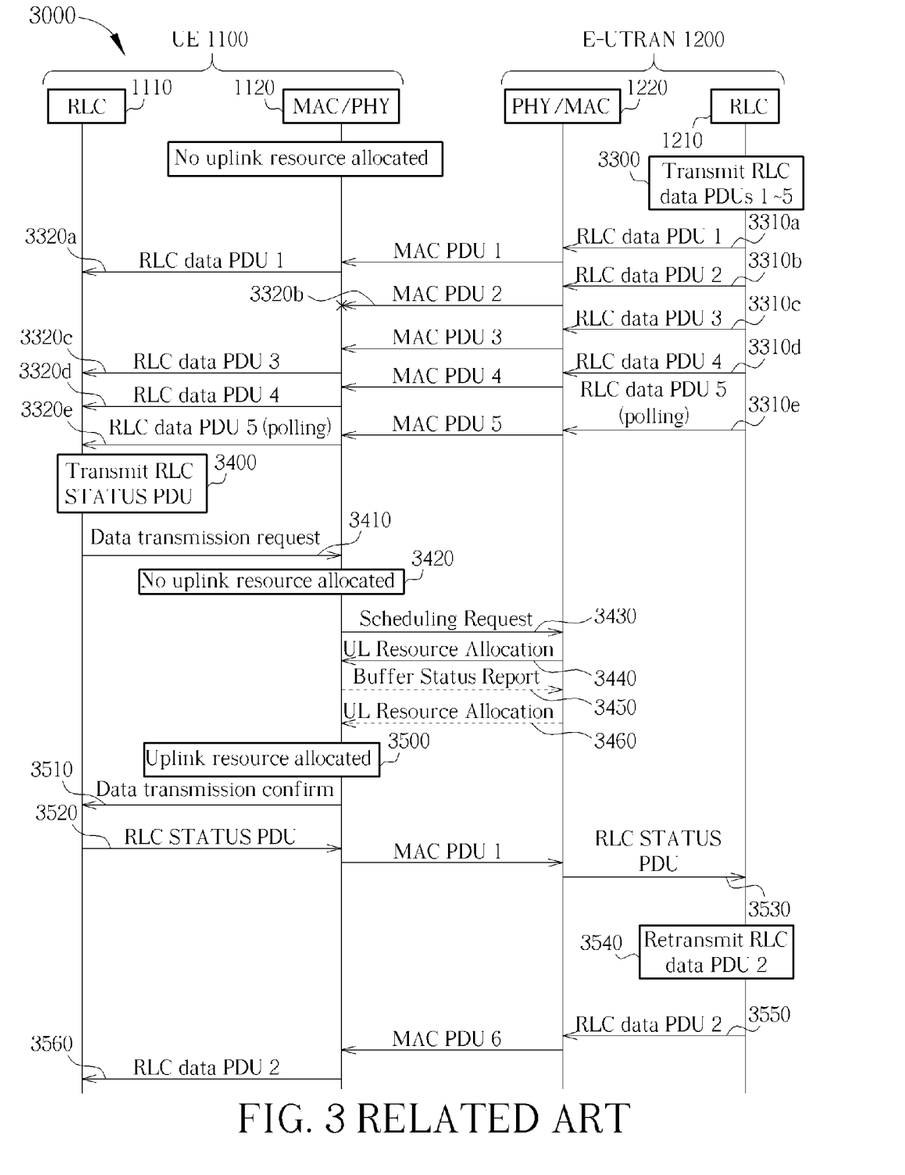
FIG. 3 shows a signaling diagram illustrating a downlink data transmission from an Evolved Universal Terrestrial Radio Access Network (E-UTRAN) to a User Equipment (UE) in an LTE system, according to the current convention.

FIG. 3 shows an exemplary signaling diagram 3000 illustrating a downlink data transmission from an Evolved Universal Terrestrial Radio Access Network (E-UTRAN) to a User Equipment (UE) in an LTE system, according to the current convention. Using substantially the same UE 1100 and E-UTRAN 1200 (and their components) as originally introduced in FIG. 1, the downlink data transmission interaction of FIG. 3 begins with the RLC 1210 of the E-UTRAN 1200 transmitting RLC data PDUs 1-5 (indicated at 3330). The RLC 1210 sends the RLC data PDUs 1-5 (indicated at 3310*a-e*) through the MAC/PHY 1220, the MAC/PHY 1120 to the RLC 1110. In this example, the RLC data PDUs 1, 3, 4, and 5 are received successfully (indicated at 3320a, 3320c, 3320d and 3320e), but the RLC data PDU 2 is not received by the RLC 1110 (indicated at 3310b). The RLC data PDU 5 also includes polling, signifying the end of transmitted data (indicated at 3320e).

Because of the missing RLC data PDU 2, the RLC 1110 initiates a transmission of an RLC status (control) PDU (indicated at 3400) and sends a data transmission request to the MAC/PHY 1120 (indicated at 3410). After receiving the data transmission request, the MAC/PHY 1120 notes that there is no sufficient uplink resource allocated for transmitting the RLC status (control) PDU (indicated at 3420) and thus sends a Scheduling Request (SR) to the MAC/PHY 1220 of the E-UTRAN 1200 (indicated at 3430). In response to the Scheduling Request, the MAC/PHY 1220 allocates an uplink resource to the MAC/PHY 1120 (indicated at 3440). Alternatively, the MAC/PHY 1220 may allocate the uplink resource in response to a Buffer Status Report sent by the MAC/PHY 1120 (indicated at 3450 and 3460). Once the uplink resource is allocated (indicated at 3500), the MAC/PHY 1120 confirms that data transmission is ready to the RLC 1110 (indicated at 3510) so that the RLC 1110 begins sending the RLC status PDU (indicated at 3520) through the MAC/PHY 1120, the MAC/PHY 1220 to the RLC 1210 of the E-UTRAN 1200 (indicated at 3530). In response to the RLC status PDU, the RLC 1210 retransmits the originally missing RLC data PDU 2 to the RLC 1110 of the UE 1100 (indicated at 3540 to 3560).

Once more, the time is consumed by sending Scheduling Request and Buffer Status Report by the MAC/PHY 1120 and waiting for uplink resource allocation from the MAC/PHY 1220 (indicated at 3430 through 3460), and the RLC 1110 of UE 1100 must wait for confirmation to send its RLC status PDU to the E-UTRAN 1200.

As illustrated in FIG. 1 and FIG. 3, it is understood that the dynamic resource allocation has the drawback that UE has to request for transmission resources and wait for the uplink resource allocation if no sufficient radio resources are allocated by E-UTRAN, and this causes a delay before its data can be transmitted, slowing down the overall communication between the UE and the E-UTRAN.

SUMMARY OF THE INVENTION

It is therefore an objective of the present invention to solve the aforementioned problems, and to provide methods for transmitting data in a wireless communication system including a User Equipment (UE) and a radio access network (RAN).

A method according to one embodiment of the present invention comprises the following steps. Firstly, the RAN transmits a MAC protocol data unit (PDU) to the UE. Afterwards, the UE returns an acknowledgement signal in response to the MAC PDU. When the RAN receives the acknowledgement signal, it allocates an uplink resource for the UE to transmit data.

A method according to another embodiment of the present invention comprises the following steps. Firstly, the RAN transmits a MAC protocol data unit (PDU) to the UE. After receiving the MAC PDU, the UE begins counting a predetermined time and sends a scheduling request (SR) to the RAN after the predetermined time. When the RAN receives the scheduling request (SR), it allocates an uplink resource for the UE to transmit data.

A wireless communication system according one embodiment of the present invention comprises a radio access network (RAN) for transmitting a MAC protocol data unit (PDU, and a User Equipment (UE) for returning an acknowledgement signal in response to the MAC PDU. When the radio access network (RAN) receives the acknowledgement signal, it allocates an uplink resource in response to the acknowledgement signal, and the UE transmits data to the RAN via the uplink resource.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Figure 2:
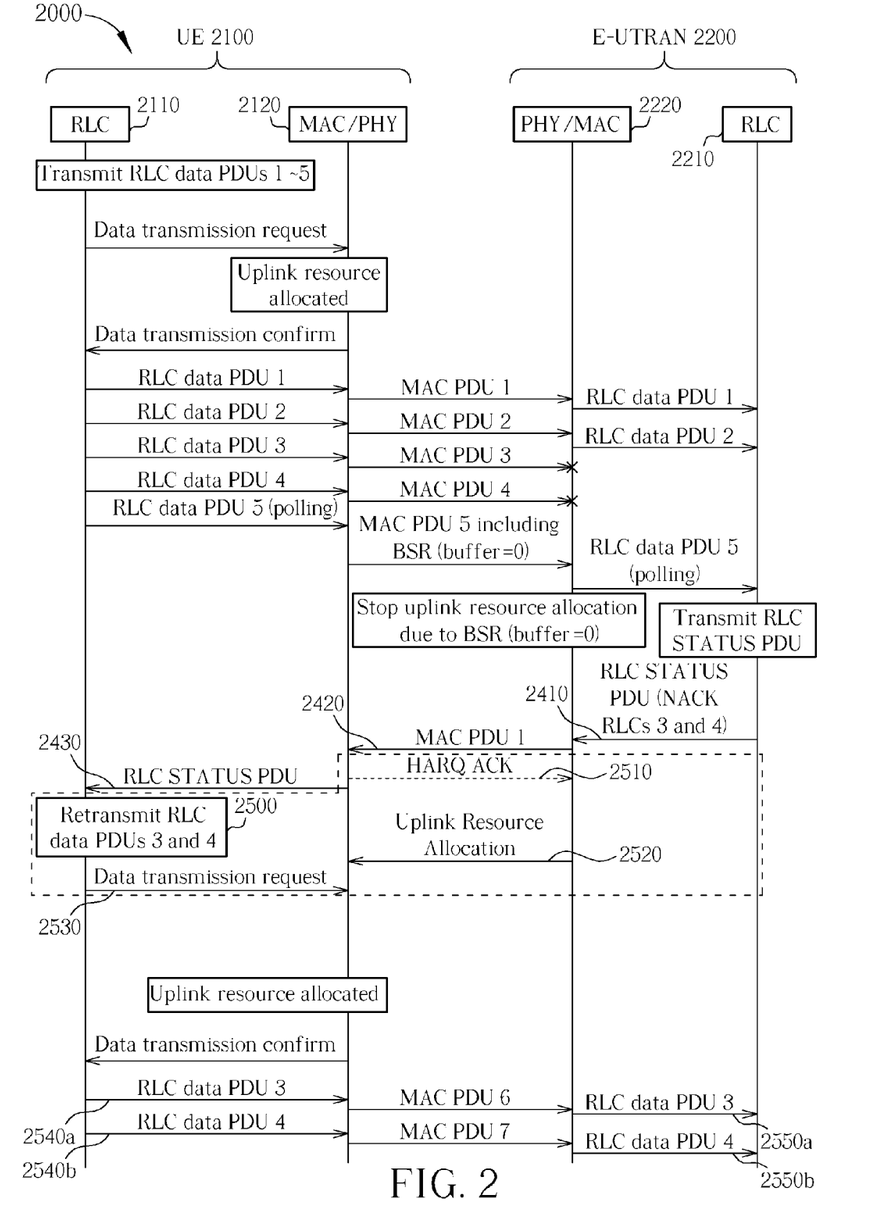
FIG. 2 shows a signaling diagram illustrating an uplink data transmission from a User Equipment (UE) to an Evolved Universal Terrestrial Radio Access Network (E-UTRAN) in an LTE system, according to an embodiment of the present invention.

Referring now to FIG. 2, the signaling diagram 2000 illustrates an uplink data transmission from a User Equipment (UE) 2100 to an Evolved Universal Terrestrial Radio Access Network (E-UTRAN) 2200 in an LTE system. The UE 2100 comprises a Radio Link Control (RLC) layer 2110 and a Medium Access Control and Physical (MAC/PHY) layer 2120. The E-UTRAN 2200 comprises an RLC layer 2210 and a MAC/PHY layer 2220. In this embodiment, the UE 2100 respectively sends five RLC data PDUs 1, 2, 3, 4 and 5 to the E-UTRAN 2200 and the RLC data PDUs 3 and 4 are not received successfully by the PHY/MAC 2220 of the E-UTRAN 2200. The procedures, e.g. the data transmission request and confirmation, the conversion from the RLC data PDU to MAC PDU and the stop of uplink resource allocation due to BSR (buffer=0), proceeded prior to the RLC 2210 sending a RLC status (control) PDU are identical to those illustrated in FIG. 1 and thus not illustrated in detail.

From the standpoint of E-UTRAN 2200, the RLC data PDUs 1, 2, and 5 are received successfully, but the RLC data PDUs 3 and 4 are not received by the MAC/PHY 2220. Therefore, the RLC 2210 of the E-UTRAN 2200 sends an RLC status (control) PDU, which includes the acknowledgement ("received") of the RLC data PDUs 1, 2, and 5 and the negative acknowledgement ("not received") of the RLC data PDUs 3 and 4, to the RLC 2110 of the UE 2100 (indicated at 2410, 2420 and 2430). In the transmission procedure, the RLC status (control) PDU is received and converted to a MAC PDU 1 by the PHY/MAC 2220 and then transmitted to the PHY/MAC 2120 of the UE 2100 (indicated at 2420). When receiving the MAC PDU 1, the PHY/MAC 2120 converts it back to the RLC status (control) PDU and sends it to the RLC 2110 (indicated at 2430).

Following the transmission of the RLC status (control) PDU, the MAC/PHY 2120 returns a Level 1 (L1) Hybrid Automatic Repeat ReQuest (HARQ) Acknowledgement (ACK), in response to the MAC PDU 1 transmitted by the MAC/PHY 2220, to the MAC/PHY 2220 (indicated at 2510).

However, in this stage of the communication, the RLC 2210 of the E-UTRAN 2200 is expecting a retransmission from the UE 2100 for the missing RLC data PDUs 3 and 4, which are not successfully received by the E-UTRAN 2200. Therefore, when the MAC/PHY 2220 of the E-UTRAN 2200 receives the HARQ ACK from the UE 2100 according to the present invention, it will allocate uplink resource(s) for the UE 2100 to retransmit the expected data, i.e. the RLC data PDUs 3 and 4. In this scenario, the uplink resource is allocated by the E-UTRAN 2200 according to the HARQ ACK from the MAC/PHY 2120. In other embodiment, the uplink resource can be allocated further according to the RLC data PDU 5, which contains the BSR trigger. Meanwhile, the RLC 2110 initiates a retransmission of the RLC data PDUs 3 and 4 (indicated at 2500), and sends a data transmission request to the MAC/PHY 2120 (indicated at 2530). Due to the pre-emptive nature of this embodiment of the present invention, the uplink resource has already been allocated by the E-UTRAN 2200 so that the RLC data PDUs 3 and 4 can be retransmitted from the RLC 2110 to the RLC 2210 (indicated at 2540a-b and 2550a-b) with a much shorter delay than previously done in prior art as illustrated in FIG. 1.

Figure 4:
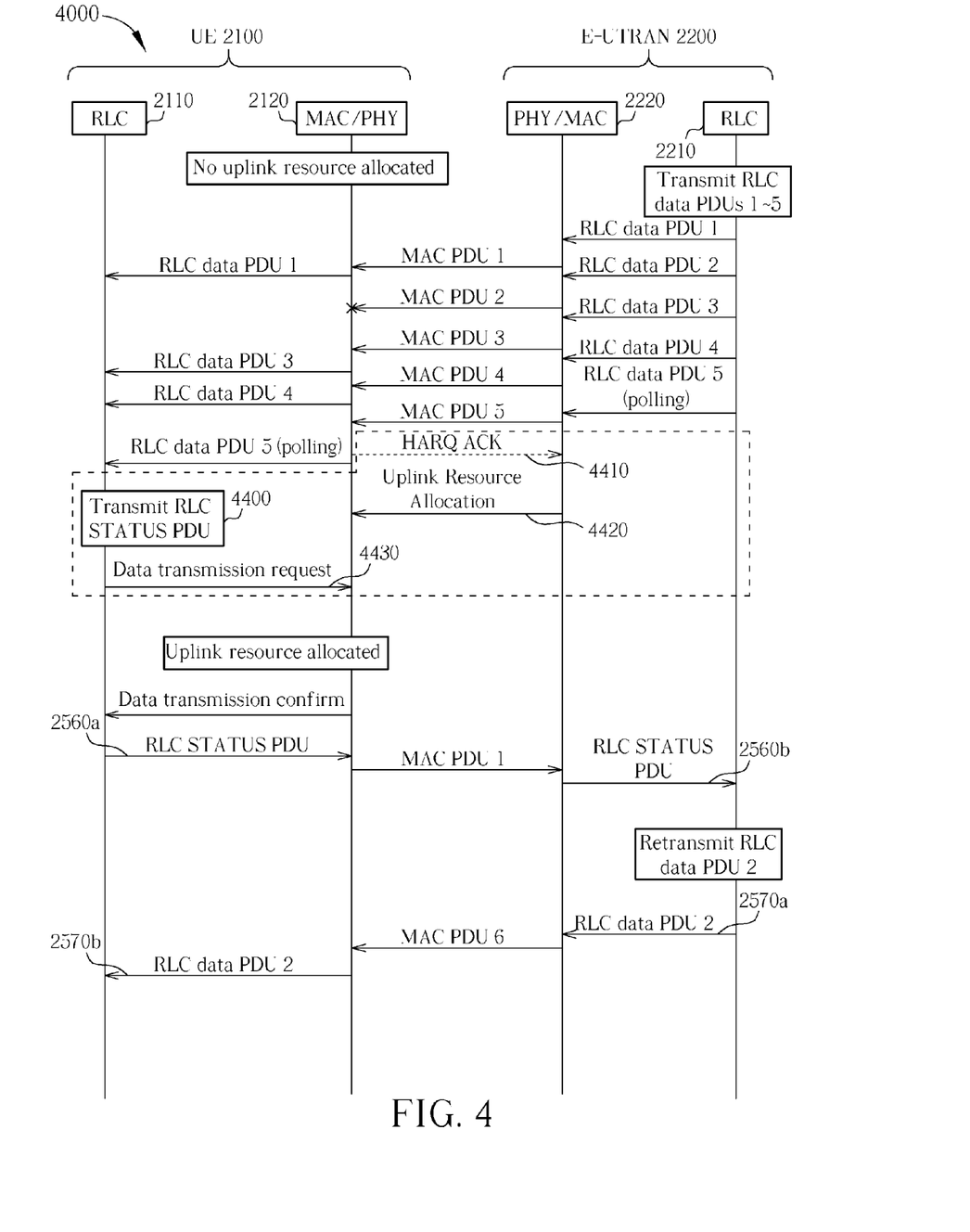
FIG. 4 shows a signaling diagram illustrating a downlink data transmission from an Evolved Universal Terrestrial Radio Access Network (E-UTRAN) to a User Equipment (UE) in an LTE system, according to another embodiment of the present invention.

FIG. 4 shows a signaling diagram 4000 illustrating a downlink data transmission from an Evolved Universal Terrestrial Radio Access Network (E-UTRAN) 2200 to a User Equipment (UE) 2100 in an LTE system, according to another embodiment of the present invention. In this embodiment, the E-UTRAN 2200 respectively sends five RLC data PDUs 1, 2, 3, 4 and 5 to the UE 2100 and the RLC data PDU 2 is not received successfully by the PHY/MAC 2120 of the UE 2100.

In the transmission procedure, the five RLC data PDUs 1, 2, 3, 4 and 5 are received and respectively converted to MAC PDUs 1, 2, 3, 4 and 5 by the PHY/MAC 2220 and then transmitted to the PHY/MAC 2120 of the UE 2100. When receiving the MAC PDUs 1, 3, 4 and 5 (MAC PDU 2 misses), the PHY/MAC 2120 converts them back to the RLC data PDUs 1, 3, 4 and 5 and sends them to the RLC 2110 respectively. The RLC data PDU 5 also includes polling, signifying the end of transmitted data.

Following the successful transmission of the RLC data PDUs 1, 3, 4 and 5, the MAC/PHY 2120 returns a Level 1 (L1) Hybrid Automatic Repeat ReQuest (HARQ) Acknowledgement (ACK), in response to the MAC PDU 5 (with polling), to the MAC/PHY 2220 (indicated at 4410). When the MAC/PHY 2220 of the E-UTRAN 2200 receives the HARQ ACK from the UE 2100 according to the present invention, it will allocate uplink resource(s) for the UE 2100 to transmit the expected data. Meanwhile, the RLC 2110 initiates the transmission of a RLC status PDU (indicated at 4400), which includes the negative acknowledgement ("not received") of the RLC data PDU 2, and sends a data transmission request to the MAC/PHY 2120 (indicated at 4430). Due to the pre-emptive nature of this embodiment of the present invention, the uplink resource has already been allocated by the E-UTRAN 2200 so that the RLC status PDU can be transmitted from the RLC 2110 to the RLC 2210 (indicated at 2560a-b) with a much shorter delay than previously done in prior art as illustrated in FIG. 3. After receiving the RLC status PDU, the RLC 2210 of the E-UTRAN 2200 retransmits the RLC data PDU 2 to the RLC 2110 of the UE 2100 (indicated at 2570a-b).

From the improvements made by the present invention over the prior arts, the delay time experienced by the RLC 2110 of the UE 2100 is greatly reduced, further heightening the efficiency of the communications in the LTE system.

Yet another embodiment of the present invention defines the Buffer Status reporting from the 3GPP TS 36.321 description presented earlier to include information about negatively acknowledged data: the specification does not explicitly state whether negatively acknowledged data should be counted in the buffer status report (BSR). As such, this embodiment comprises receiving a BSR for a UE transmission buffer from the UE, at which time the E-UTRAN expects the RLC data PDU retransmission and allocates an uplink resource appropriately. In yet another embodiment, the E-UTRAN expects an RLC data PDU retransmission and allocates an uplink resource appropriately after receiving a BSR for a UE transmission buffer from the UE, where the BSR contains both a UE transmission buffer and a UE retransmission buffer.

In another embodiment, please referring to FIG. 2 and FIG. 4, if the E-UTRAN 2200 does not allocate an uplink resource to the UE 2100 in response to the HARQ ACK within a predetermined time, the MAC/PHY 2120 of the UE 2100 may automatically transmit a scheduling request (SR) to the E-UTRAN 2200 for requesting the uplink resource allocation from the E-UTRAN 2200 after the predetermined time. The predetermined time may be implemented differently according to design and requirements. In this embodiment, the predetermined time can be set and begin counting when the MAC/PHY 2120 transmits the HARQACK to the E-UTRAN 2200. In other embodiment according to the present invention, the predetermined time may be set and begin when the UE 2100 receives a MAC PDU, which includes a RLC status PDU or a negative acknowledgement ("not received") of at least one RLC data PDU. And there is no limitation in the present invention that this predetermined time must be set by a specific device: it can be configured by either the E-UTRAN 2200 or the UE 2100, as needed by the designer's specs.

It should be noted that although the above embodiments specifically refer to a User Equipment (UE) and an Evolved Universal Terrestrial Radio Access Network (E-UTRAN) in the signaling diagrams and examples, this should in no way be construed to be a limitation of the present invention: they are intended for illustrative purposes only. In addition, while specifications from the 3GPP TS 36.231 standard have been mentioned, they are pointed to only as an example of a situation where an implementation of the specification would benefit greatly from methods of the present invention. Thus, the present invention can be applied to any wireless communications system which experiences a delay such as the examples provided, and such applications and embodiments also obey the spirit of and should be considered with the scope of the present invention.

Figure 5:
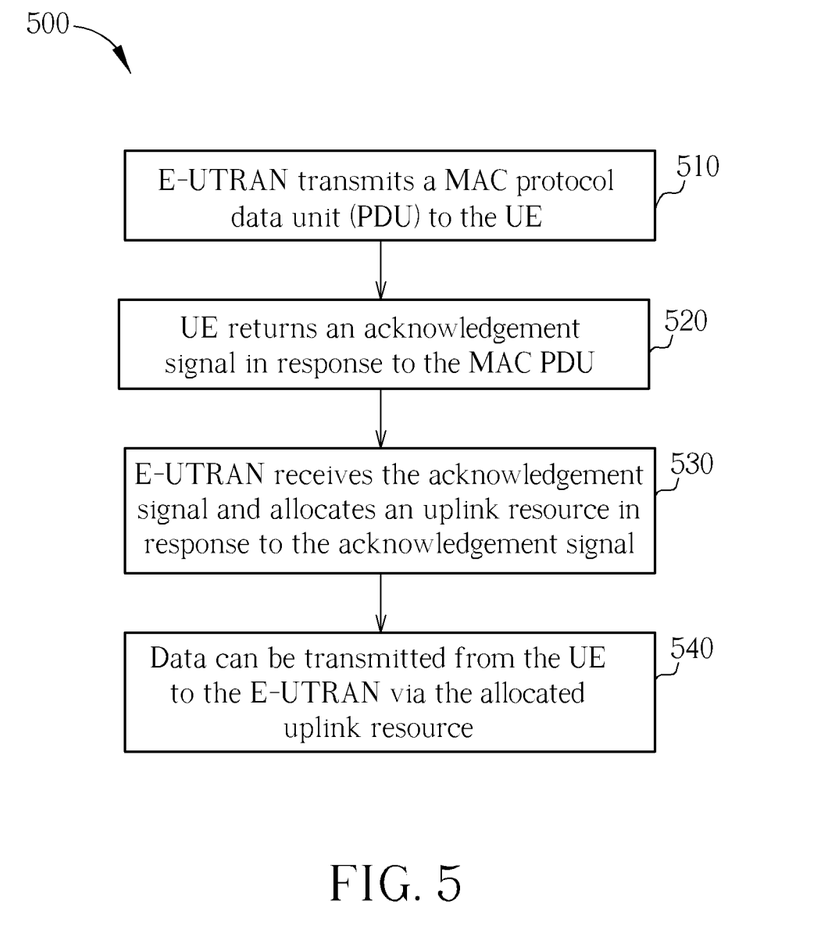
FIG. 5 shows a flowchart illustrating a method for transmitting data between a User Equipment (UE) and an Evolved Universal Terrestrial Radio Access Network (E-UTRAN) in an LTE system, according to an embodiment of the present invention.

FIG. 5 shows a basic flowchart 500 illustrating a method for transmitting data between an UE and an E-UTRAN in an LTE system, according to an embodiment of the present invention. In this embodiment, the UE can be any portable hand-held devices, e.g. mobile phones or PDA phones, with wireless communication functions. Provided that substantially the same result is achieved, the steps of the process flowchart need not be in the exact order shown and need not be contiguous; that is, other steps can be intermediate. Please refer to FIGS. 2, 4 and 5, this embodiment of the method according to the present invention includes the following steps:

Step 510: The MAC/PHY 2220 of the E-UTRAN 2200 transmits a MAC protocol data unit (PDU) to the MAC/PHY 2120 of the UE 2100. The MAC protocol data unit (PDU) may be the MAC PDU 1 including a negative acknowledgement ("not received") of at least one RLC data PDU sent by the UE 2100 as shown in FIG. 2, or the MAC PDU 5 converted from the RLC data PDU 5 (polling) as shown in FIG. 4.

Step 520: The MAC/PHY 2120 of the UE 2100 returns an acknowledgement signal in response to the MAC PDU. The acknowledgement signal may be the HARQACK shown in FIG. 2 and FIG. 4.

Step 530: The MAC/PHY 2220 of the E-UTRAN 2200 receives the acknowledgement signal and allocates an uplink resource (indicated at 2520 in FIG. 2 and at 4420 in FIG. 4) in response to the acknowledgement signal.

Step 540: The data can be transmitted from the UE 2100 to the E-UTRAN 2200 via the allocated uplink resource. The data may be the RLC data PDUs 3 and 4 shown in FIG. 2 and the RLC status PDU shown in FIG. 4 transmitted from the UE 2100 to the E-UTRAN 2200.

Figure 6:
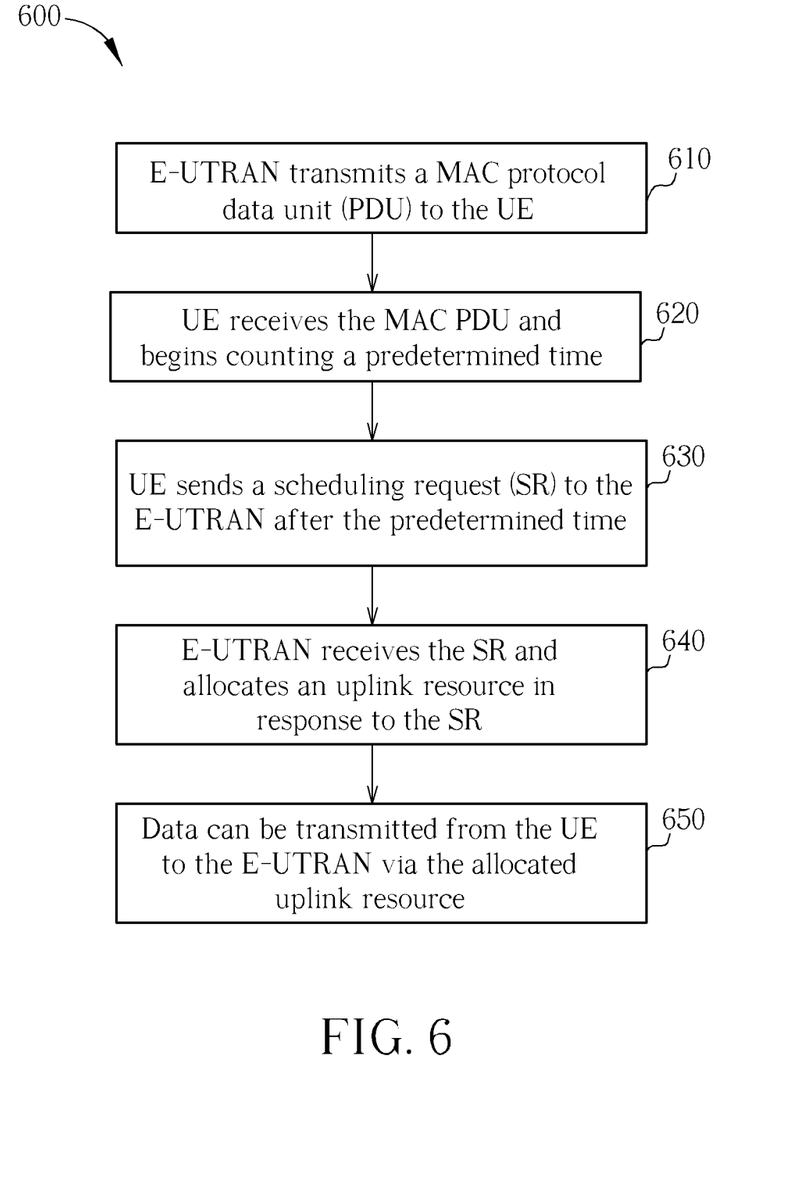
FIG. 6 shows a flowchart illustrating a method for transmitting data between a User Equipment (UE) and an Evolved Universal Terrestrial Radio Access Network (E-UTRAN) in a LTE system, according to another embodiment of the present invention.

FIG. 6 shows a basic flowchart 600 illustrating a method for transmitting data between an UE and an E-UTRAN in an LTE system, according to another embodiment of the present invention. Please refer to FIG. 2, 4 and 6, this embodiment of the method according to the present invention includes the following steps:

Step 610: The MAC/PHY 2220 of the E-UTRAN 2200 transmits a MAC protocol data unit (PDU) to the MAC/PHY 2120 of the UE 2100. The MAC protocol data unit (PDU) may be the MAC PDU 1 including a negative acknowledgement ("not received") of at least one RLC data PDU sent by the UE 2100 as shown in FIG. 2, or the MAC PDU 5 converted from the RLC data PDU 5 (polling) as shown in FIG. 4.

Step 620: The MAC/PHY 2120 of the UE 2100 receives the MAC PDU and begins counting a predetermined time.

Step 630: The MAC/PHY 2120 of the UE 2100 sends a scheduling request (SR) to the MAC/PHY 2220 of the E-UTRAN 2200 after the predetermined time (not shown in FIG. 2 and FIG. 4).

Step 640: The MAC/PHY 2220 of the E-UTRAN 2200 receives the scheduling request (SR) and allocates an uplink resource in response to the scheduling request (SR).

Step 650: The data can be transmitted from the UE 2100 to the E-UTRAN 2200 via the allocated uplink resource. The data may be the RLC data PDUs 3 and 4 shown in FIG. 2 and the RLC status PDU shown in FIG. 4 transmitted from the UE 2100 to the E-UTRAN 2200.

It should be noted that the E-UTRAN 2200 according the present invention may include a Node B, i.e. a base station, for implementing all the functions implemented by the E-UTRAN as described in the above-mentioned embodiments of FIG. 2 and FIG. 4.

Figure 7:
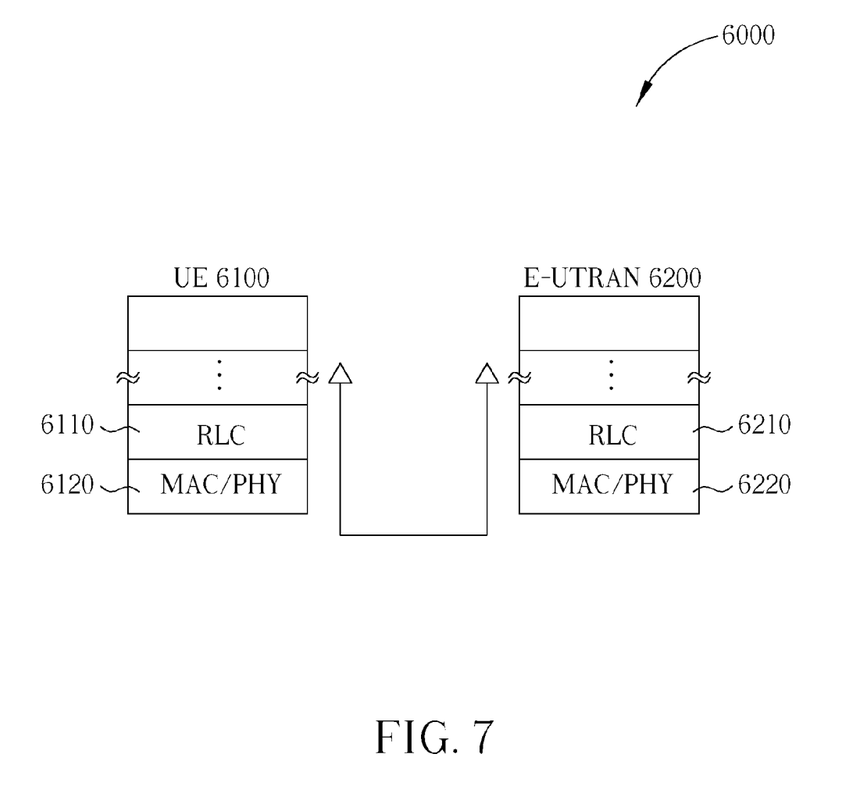
FIG. 7 is a diagram of a User Equipment (UE) and an Evolved Universal Terrestrial Radio Access Network (E-UTRAN) as a communication system, according to an embodiment of the present invention.

FIG. 7 is a diagram of a User Equipment (UE) and an Evolved Universal Terrestrial Radio Access Network (E-UTRAN) as a wireless communication system 6000, according to an embodiment of the present invention. As shown, the wireless communication system 6000 comprises a User Equipment (UE) 6100 and an Evolved Universal Terrestrial Radio Access Network (E-UTRAN) 6200. The UE 6100 comprises a Radio Link Control (RLC) layer 6110 and a Medium Access Control and Physical (MAC/PHY) layer 6120, and the E-UTRAN 6200 comprises an RLC layer 6210 and a MAC/PHY layer 6220. As the methods described above, in their various embodiments, have already covered the functionalities and utilizations of the UE 6100, RLC 6110, MAC/PHY 6220, E-UTRAN 6200, RLC 6210, and MAC/PHY 6220, further description is omitted.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the systems, methods and steps described in the specification. As one of ordinary skill in the art will readily appreciate from the disclosure of the present invention, systems, methods, or steps, presently existing or later to be developed, that perform substantially the same function or achieve substantially the same result as the corresponding embodiments described herein may be utilized according to the present invention. Accordingly, the appended claims are intended to include within their scope such systems, methods, or steps.

Those skilled in the art will readily observe that numerous modifications and alterations of the device and method may be made while retaining the teachings of the invention.

What is claimed is:

1. A method for data transmission in a wireless communication system including a User Equipment (UE) and a radio access network (RAN), the method utilized in the RAN and comprising:

receiving an uplink Radio Link Control (RLC) data protocol data unit (PDU) including a polling request from the UE for requesting the RAN to transmit a RLC status PDU;

transmitting a Medium Access Control (MAC) PDU to the UE, wherein the MAC PDU includes an RLC status PDU indicating at least one negative acknowledgement corresponding to at least one unsuccessfully received uplink RLC data PDU;

receiving an acknowledgement signal in response to the MAC PDU including the RLC status PDU from the UE; and allocating an uplink resource to the UE in response to the acknowledgement signal, wherein the uplink resource is for the UE to retransmit at least one uplink data packet corresponding to the unsuccessfully received uplink RLC data PDU before a request for data transmission is received.

2. The method of claim 1, wherein the uplink RLC data PDU including the polling request is the last uplink RLC data PDU of an uplink session, and before the request for data transmission is received, at least one former uplink RLC data PDU has been determined to be unsuccessfully received.

3. The method of claim 1, wherein the MAC PDU further includes a negative acknowledgement of at least one RLC Data PDU sent by the RLC layer of the UE.

4. The method of claim 1, wherein the wireless communication system is an LTE system and the RAN is an Evolved Universal Terrestrial Radio Access Network (E-UTRAN).

5. The method of claim 1, wherein the acknowledgement signal is a Hybrid Automatic Repeat ReQuest (HARD) Acknowledgement (ACK).

6. The method of claim 1, further comprising:
receiving a buffer status report (BSR) indicating empty buffer from the UE and stopping uplink resource allocation due to the BSR, before the uplink RLC data PDU including the polling request is received.

7. The method of claim 4, wherein the E-UTRAN includes a Node B for implementing the steps of transmitting the MAC protocol data unit (PDU) and the step of receiving the acknowledgement signal and allocating the uplink resource.

* * * * *